May 11, 1965   C. S. COCKERELL   3,182,739
VEHICLES FOR TRAVELLING OVER LAND AND/OR WATER
Filed Sept. 1, 1959   6 Sheets-Sheet 2

INVENTOR
CHRISTOPHER SYDNEY COCKERELL

BY Cameron, Kerkam & Sutton
ATTORNEYS

May 11, 1965  C. S. COCKERELL  3,182,739
VEHICLES FOR TRAVELLING OVER LAND AND/OR WATER
Filed Sept. 1, 1959  6 Sheets-Sheet 3

INVENTOR
CHRISTOPHER SYDNEY COCKERELL
BY Cameron, Kerkam & Sutton
ATTORNEYS

May 11, 1965 C. S. COCKERELL 3,182,739
VEHICLES FOR TRAVELLING OVER LAND AND/OR WATER
Filed Sept. 1, 1959 6 Sheets-Sheet 5

*INVENTOR*
CHRISTOPHER SYDNEY COCKERELL

BY Cameron, Kerkam + Sutton
*ATTORNEYS*

May 11, 1965     C. S. COCKERELL     3,182,739
VEHICLES FOR TRAVELLING OVER LAND AND/OR WATER
Filed Sept. 1, 1959     6 Sheets-Sheet 6

INVENTOR
CHRISTOPHER SYDNEY COCKERELL

BY
Cameron, Kerkam & Sutton
ATTORNEYS

United States Patent Office 3,182,739
Patented May 11, 1965

3,182,739
VEHICLES FOR TRAVELLING OVER
LAND AND/OR WATER
Christopher Sydney Cockerell, East Cowes, Isle of Wight,
England, assignor to Hovercraft Development Limited,
London, England, a British company
Filed Sept. 1, 1959, Ser. No. 837,502
Claims priority, application Great Britain, Sept. 1, 1958,
27,978/58
19 Claims. (Cl. 180—7)

This invention relates to vehicles for travelling over land and/or water of the kind described in copending application Serial No. 627,925, filed December 12, 1956, corresponding to British Patent specification No. 35,656/55. In such a vehicle means are arranged to discharge at least one jet of fluid in the form of, or which results in the formation of, a curtain which effectively encloses a space beneath the underside of the vehicle and a surface over which the vehicle is to hover or travel, the discharging means being arranged to expel the jet of fluid with a total thrust which is substantially less than the total weight of the vehicle, and the arrangement being such that, when the discharging means is in operation and the curtain of fluid is formed, pressures can be built up within the said space to the extent that is necessary to support or assist in supporting the vehicle out of contact with the surface. The term "vehicle" as used herein is to be understood as including a platform or the like which is supported above the land or water as described above but it is normally intended to remain stationary, for example, for supporting radar installations.

As described in the aforesaid application the curtain-forming fluid issues from a port or ports in or near the bottom of the vehicle or at least substantially below its centre of gravity. The height (herein called the hoverheight) at which the bottom of the body of the vehicle is spaced from the surface when equilibrium conditions have been reached is a function of the thrust with which the fluid jet is ejected, the said thrust being one of the limiting factors governing the maximum vertical height of the curtain. The larger the thrust with which the fluid jet is expelled the stronger or stiffer the curtain will be, and it is therefore possible for the vehicle to operate at a greater hoverheight before the curtain loses its capacity to contain the cushion of fluid beneath the vehicle. Increasing the thrust of the fluid jet requires an increase in power requirements. The object of the present invention is to enable the main body of the vehicle to ride without damage or undue accelerations over waves or other obstructions without increasing the thrust of the fluid jet to a value which would otherwise be necessary.

The invention consists in a vehicle which comprises an intake for a fluid, and means for drawing fluid through the intake and causing it to issue from the lower part of the vehicle in such a way as to result in the formation and maintenance of at least one curtain of moving fluid which travels across the gap that in operation exists between the surface over which the vehicle is to hover or travel and the structure of the vehicle, and which, together with the said structure and surface, encloses a space into which the said fluid, or a gas other than the said fluid, flows so as to result in the formation of a pressurised cushion or cushions by which, augmented by any vertical component of jet reaction and/or aerodynamic or other lift which may be present, the vehicle is supported, the pressure of the cushion causing, and in its turn being contained due to, a change of direction of the moving fluid which results in a curvature of the curtain. The characteristic feature of the invention is that at least a portion of the part of the vehicle from which the curtain-forming fluid finally issues is flexibly attached to and below the main body of the vehicle in such a manner that it experiences a restoring force tending to prevent vertical movement as a whole or locally, and that means are provided to deflect the said portion as a whole or locally upwards against the restoring force, which means are arranged to be operated by local elevations in the surface over which the vehicle is travelling.

The restoring force may be provided by spring controlled or hydraulically-controlled rams or jacks or by an air chamber whose volume is altered by vertical movement of the flexible attached part of the vehicle as a whole and/or locally. Alternatively, the restoring force may be provided by the cushion pressure itself acting on a concave interior surface of the flexibly attached part of the vehicle. Again, if two curtains are provided one inboard of the other, the space between them being compartmented by transverse curtains, a local lowering of the surface relatively to the vehicle causes a drop in the pressure of the secondary cushion within the relevant compartment, and the excess of atmospheric pressure produces a suction effect which is equivalent to a downward restoring force.

The means for deflecting the flexibly attached part of the vehicle preferably consist of the secondary pressurised cushion formed between two curtains as just described. Alternatively or in addition the said flexibly attached part of the vehicle may be provided with a number of planing surfaces or hydrofoils, if the vehicle is intended to travel over water, or a number of wheels or skids if it is intended to travel over land.

If desired, the deflection of the flexibly attached part of the vehicle may be brought about by a servo device operated by one of the means just described, or by the variation of a parameter which varies with height of the flexibly attached part of the vehicle, but is not itself strong enough to actuate the flexible part of the vehicle, for example, the back pressure of the curtain-forming jet, or its mass flow or velocity, or the local pressure of the main cushion itself.

The fluid forming the curtain may be air and this will be assumed for convenience of description hereinafter, although other fluids could be used, for example, the exhaust gases of an engine, or water.

The invention will be more readily understood by the following description, by way of example, of various embodiments in conjunction with the accompanying drawings, in which FIGURE 12 is a diagrammatic cross section of still yet a further vehicle according to the invention, FIGURE 13 is a diagrammatic cross section of a vehicle similar to that illustrated in FIGURE 12, but of a smaller size.

Figure 1:
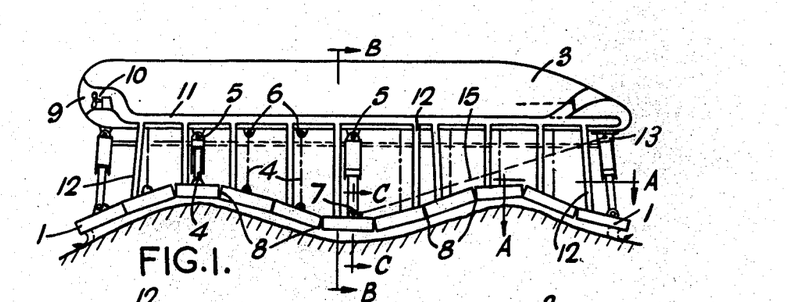
FIGURE 1 is a diagrammatic side elevation of one form of a vehicle according to the invention, partly in section.
Figures 2, 3, 4:
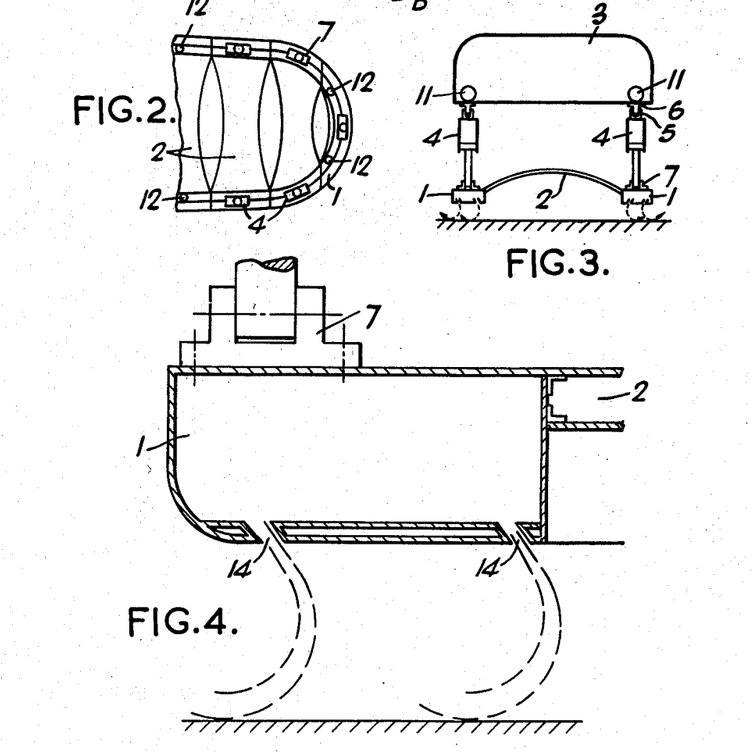
FIGURE 2 is a sectional plan view on the line A—A of FIGURE 1.
FIGURE 3 is a cross section on the line B—B of FIGURE 1.
FIGURE 4 is a cross section, on an enlarged scale, on the line C—C of FIGURE 1.

FIGURES 1, 2 and 3 of the accompanying drawings illustrate diagrammatically the principle of the invention. As shown therein, a duct 1 is formed at the edge of an articulated membrane formed of sections 2 connected by flexible elements to form a member which is supported from the body 3 of the vehicle by means of hydraulic rams 4, positioned around the periphery of the vehicle. The rams are, generally, pivotally connected at their upper ends 5 to fixtures 6 on the underside of the body 3, and similarly connected at their lower ends to fixtures 7 on the membrane 2, but to maintain stability and correct positional relationship between the body and the membrane at least one ram, for example, the one at the rear of the vehicle, i.e., at the right hand side of FIGURE 1, is rigidly attached to the bottom of the body as indicated at 13. As an alternative or an addition to the rigidly attached hydraulic ram, tie rods, as indicated by the dotted line 15 in FIGURE 1, may be used for maintaining positional relationship. The duct 1 is formed right round the periphery of the membrane, suitable connections being provided at the articulation joints 8. Air enters the body through an inlet 9 at the front of the vehicle and passes through compressors 10 into a duct 11 positioned around the periphery of the body 3, at the bottom. Air is conveyed from the duct 11 to the duct 1 by suitable means, such as flexible pipes 12. The membrane is arched (as shown in FIGURE 3 of the accompanying drawings) to avoid hitting obstructions, such as waves, which pass sideways under the vehicle. It is necessary to arch the membrane in this manner in the examples illustrated as it will be seen that when an obstruction passes under the vehicle sideways, the duct section at one side lifts over it and then returns to its normal position before the duct section on the other side lifts. Thus the centre of the membrane must be high enough to avoid contact. If the membrane is of flexible material, the cushion of air under it will maintain it in its correct shape under normal conditions, while allowing it to distort should the upward deflecton of the duct section be sufficient for the membrane to contact the bottom of the body of the vehicle.

FIGURE 4 of the accompanying drawings illustrates, on a larger scale, a typical form of curtain-forming means for the vehicle shown in FIGURE 1. The air in the duct 1 is ejected through ports 14 which extend around the periphery of the membrane, in an annular form. The air is expelled with a velocity component inwards towards the centre of the membrane to form two curtains. As pressure builds up under the membrane and in the space between the curtains the curtains are then deflected outwards, until they follow a curved path with a mean radius of curvature equal to about half the height between the bottom of the duct 1 and the subjacent surface, the centres of curvature being outside the envelope and substantially vertically beneath the respective peripheral port 14.

The flexible part of the vehicle comprising the duct 1 and membrane 2 is capable of vertical movement locally and this movement is actuated by obstructions in the surface over which the vehicle is travelling and which bring about local pressure changes in the secondary cushion between the two curtains. The upward movement is subject to a restoring force due to the hydraulic fluid in the pressure chamber connected to the rams 4, although in the special case in which the algebraic sum of the ram deflections is zero due, for example, to a symmetrical wave formation, the individual rams will not experience a restoring force, ignoring the effect of inertia.

The arrangement shown in FIGURES 1, 2 and 3 of the accompanying drawings will lack stability in that any variation of the load distribution, for example, will cause the body to tilt. This can be obviated by connecting the rams in banks, each bank having a separate or semi-separate pressure chamber. With such an arrangement of pressure chambers it will be appreciated that alteration of the pressure in one of the chambers brings about an alteration in the mean trim of the vehicle.

Figure 5:
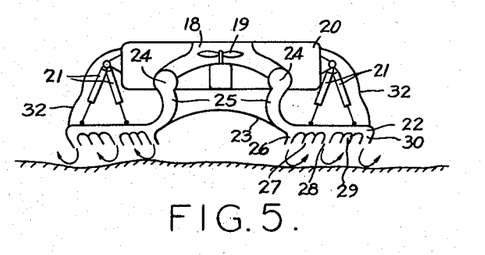
FIGURE 5 is a diagrammatic cross section of a further form of vehicle according to the invention.
Figure 5A:
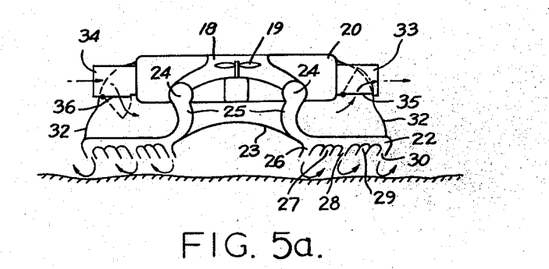
FIGURE 5a is a diagrammatic cross section of a modified form of the vehicle illustrated in FIGURE 5.
Figure 6:
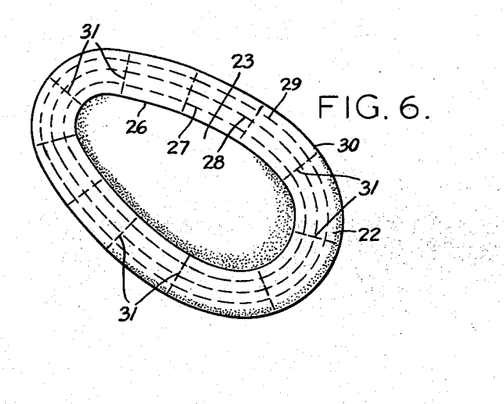
FIGURE 6 is a plan view of the vehicle illustrated in FIGURE 5.

FIGURES 5 and 6 of the accompanying drawings show an arrangement using a similar principle to that of FIGURE 1 making use of flexible materials. The main body 20 of the vehicle carries a plurality of hydraulic rams 21 mounted around the periphery of the body, being pivoted at their upper ends to the body 20 and at their lower ends to an annular duct 22. The duct forms a flexible rim and the centre of the annulus formed by the duct is closed by a flexible membrane 23. Since the duct 22 is flexible, and since the rams 21 which are mounted at various points around the periphery of the body 20 are pivotally connected to both the body and the duct, it will be apparent that each portion of the duct to which a ram is connected is locally movable relative to the other portions. Air is drawn into the body of the vehicle through an intake 18 by a compressor 19. From the compressor the air is fed into ducts 24 in the body of the vehicle and thence to the duct 22 by the flexible supply pipes 25. In this example, as shown in the cross section in FIGURE 5, the duct 22 is provided with a series of mouths or ports 26, 27, 28, 29 and 30 by means of which a multiple curtain system is created. The air expelled from port 26 is deflected and is then recollected into port 27. The air collected into port 27 may recirculate back into the air expelled from port 26 or may be partly or wholly included in the air being expelled from port 28 or even port 30. A similar recirculation of the air expelled from port 28 is also obtained. This form of curtain fluid recovery and recirculation is more fully described in co-pending application Serial No. 809,699, filed April 29, 1959, corresponding to British application No. 27,977/58. When multiple curtain systems are used, transverse ports, shown by dotted lines 31 in FIGURE 6, may be provided so as to produce transverse curtains which divide the main curtain system into air cells. These air cells enhance the stability of the vehicle. The space between the body of the vehicle and the duct 22 may be enclosed by a gas tight flexible member or membrane 32 the purpose of which is described below.

Figure 7:
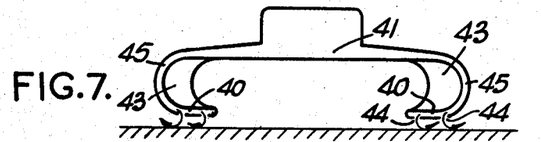
FIGURE 7 is a diagrammatic cross section of yet a further form of vehicle according to the invention.

FIGURE 7 of the accompanying drawings shows an arrangement in which the rams are dispensed with. An annular member 40 is supported from the bottom of the body 41 of the vehicle by a hollow annular flexible tube 43 filled with air. Suitable ports 44 are provided in the bottom of the member 40 for the formation of curtains, air for the curtains being fed to the member from the body 41 by means of a further annular tube 45 formed outside the outer wall of the tube 43. The pressure of the air in the tube 43 is made less than the normal cushion pressure under the vehicle so that the inner wall of the tube will, as shown, be concave in normal operating conditions. The force acting to return the duct 40 to its normal position, when it has been deflected upward by some obstacle, is obtained by the compression of the air in the tube 43 by distortion. In order to obtain stability the tube is preferably divided into separate arcuate compartments by means of radially extending flexible diaphragm (not visible in FIG. 7).

Figure 8:
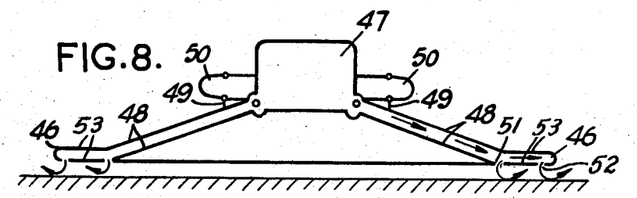
FIGURE 8 is a diagrammatic cross section of another form of vehicle according to the invention.
Figure 9:
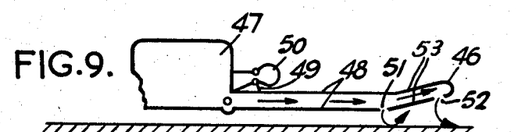
FIGURE 9 is a part cross section of the vehicle illustrated in FIGURE 8 showing a variation in operating conditions.
Figure 10:
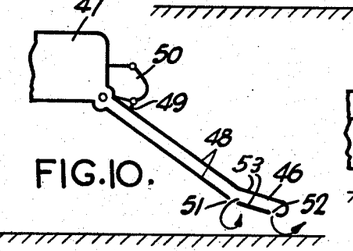
FIGURE 10 is another part cross section of the vehicle illustrated in FIGURE 8 showing a further variation on operating conditions.

The arrangement shown in FIGURE 7 may have too high an effective spring rate. In FIGURES 8, 9 and 10 of the accompanying drawings a duct 46 is supported from the body 47 by means of rigid hinged members 48, the duct being formed from two spaced annular web 53. Pivoted rods 49 are carried by the hinged members 48 and bear on a chamber 50 containing air. By adjusting the size of the chamber in relation to the stroke of each rod when deflected by a hinged member, a control of effective spring rate may be attained. Air is expelled from annular ports 51 and 52 formed in the bottom of the duct 46 to form the curtains, air being supplied to the duct from the body of the vehicle by suitable pipes (not shown). FIGURE 8 shows the vehicle in a normal equilibrium condition, and in FIGURE 9 one portion of the duct 46 is shown deflected as would occur when encountering an obstacle. The upward movement of one or more of the hinged members 48 causes the rods carried by such members to distort the chamber 50 which, of course, compresses the air thus providing a restoring force. FIGURE 10 shows the deflection of the hinged members 48 when passing over a hollow, the movement of the members causing an expansion of the chamber 50. Again the chamber 50 is preferably divided into separate arcuate sections to improve stability.

Figure 11:
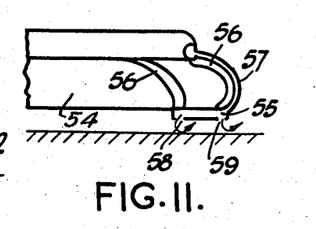
FIGURE 11 is a diagrammatic partial cross section of yet another form of vehicle according to the invention.

In a further example, shown in FIGURE 11 of the accompanying drawings, a duct 55 is supported from the body of the vehicle by means of hollow flexible members 56, containing pressurised air, the fluid supply for the curtains being fed to the duct by flexible pipes 57, and being expelled from ports 58 and 59. Deflection of the duct will cause distortion of the hollow members 56, a variation in pressure of the air in the members occurring and providing a restoring force. The hollow members 56 may be separate individual tubes, in which case they may be connected for example by a continuous membrane 54 attached to the inner members.

It will be seen that in the examples so far described deflections of the duct from which is expelled the fluid forming the curtains cause the bottom surface of the duct to be at an angle to the suface beneath the vehicle. This variation in attitude of the bottom surface of the duct prevents the most efficient operation of the curtain system. In FIGURES 12 and 13 of the accompanying drawings, there is illustrated a method of supporting the duct in which that part of the bottom surface which contains the ports from which the curtain is formed, remains substantially horizontal. FIGURE 12 shows the method applied to a comparatively large vehicle and FIGURE 13, applied to a smaller vehicle. A duct 60 is supported around the body of the vehicle by means of normally horizontal members 61 pivotally connected at their ends to the duct and the vehicle body respectively. The space 62 between the members 61 is made gas tight by means of flexible membranes (not shown separately from member 61), the space thus formed containing pressurised air. The duct is either completely flexible or is made from rigid arcuate sections flexibly joined together to allow for local deflection of the duct. Air is fed by pipes (not shown) from the body of the vehicle to the duct 60, the air being expelled from ports 63 to form curtains. The cross section of the duct 60, particularly with regard to the bottom and outer surfaces, is made such that any forces acting on the duct by actual contact with an obstacle, will cause an upward component of force to act on the duct and its supporting linkage.

Figures 14, 22:
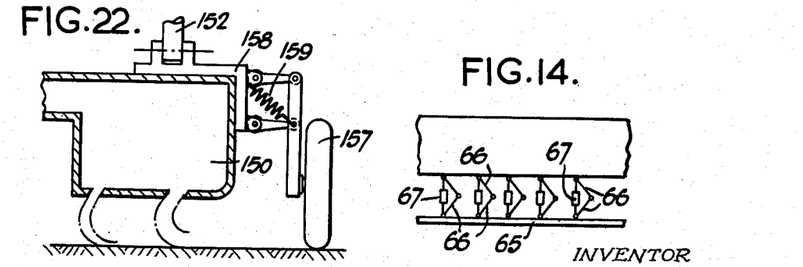
FIGURE 14 is a diagrammatic partial side elevation of a further embodiment of the invention.
FIGURE 22 is a diagrammatic cross section on the line D—D of FIGURE 20, illustrating a modification.

While it is intended that actual contact of the duct or its supporting means by an obstruction shall be avoided, it is possible that occasional contact may occur particularly when travelling over rough water. Such contact will impose high shear and bending stresses on the support members. This can be avoided to a substantial degree by making the support members such that at least the lower parts of the support members deflect rearwards in a plane which is substantially parallel to the longitudinal axis of the vehicle when the duct is deflected upwards. FIGURE 14 of the accompanying drawings is a partial side elevation of one such construction.

A duct 65 is supported from the body of the vehicle by means of a series of articulated parallel linkages 66 around the periphery. Hydraulic rams 67 act on the linkages and deflection of the linkages by the duct causes operation of the rams 67 in a manner similar to those in FIGURE 1 of the accompanying drawings. This form of construction will also allow the duct more readily to follow the contour of the obstruction in that the pressure of the cushion of fluid contained within the curtains and supporting the vehicle does not act on the supporting members in such a manner as to affect to any large degree the vertical movement of the duct. In some examples, particularly those shown in FIGURES 8 to 13, it will be seen that the cushion acts on the under surface of the supporting members and under some conditions this will affect the operation of these members, although this can be mitigated to a large extent by providing a further flexible membrane enclosing a further "cushion" of air on the upper side of the supporting members, and opposing the action of the cushion underneath the supporting members.

The cushion of air supporting the vehicle may be contained in a space bounded by the curtain formation at the edges, the surface over which the vehicle is hovering or travelling and a membrane at the level of the duct, such as is shown in FIGURES 1 to 6 of the accompanying drawings. The space above the membrane and beneath the bottom of the body of the vehicle may be completely open as in FIGURE 1 of the accompanying drawings. In such an example the membrane has to withstand the pressure of the cushion, and where a fully flexible membrane is used, as shown at 23 in FIGURE 5 of the accompanying drawings, the stresses can be very large and may necessitate a heavy form of construction. If however the space between the membrane 23 and the body of the vehicle is enclosed by a second flexible membrane member as shown at 32 in FIGURE 5 of the accompanying drawings, and the enclosed space is filled with air at a pressure approximately equal to the normal cushion pressure, then the loads on the membrane 23 are transmitted to the bottom of the body and the membrane 23 can be of light construction. A further alternative is to allow the cushion to occupy the whole space between the bottom of the body of the vehicle and the surface, being bounded at the sides by the curtain formation at the bottom and by a flexible gas tight member conveniently forming part of or being attached to the flexible supporting members. Such a construction is illustrated in the various examples shown in FIGURES 7 to 13 of the accompanying drawings.

In the example shown in FIGURE 5 of the accompanying drawings with flexible member 32, any sudden deflection up or down of any part of the duct is likely to cause rapid variations of pressure within the chamber between the membrane and the body of the vehicle, tending to produce undesirable movements of the vehicle body. To prevent or reduce this tendency large ports must be provided to allow air to enter or leave the chamber as its volume changes. As, however, the air in the chamber is intended to transfer the loads from the membrane 23 to the bottom of the body of the vehicle, the air must be maintained at some definite pressure. It is possible to do this quite simply, when the vehicle is travelling, in the manner illustrated in FIGURE 5a, i.e. by making the port 33 for letting out the air from the chamber at the rear of the vehicle, and the inlet port 34 at the front, using the ram pressure to maintain the pressure in the chamber. Any expulsion of air from the chamber will thus assist in propelling the vehicle. A valve 35 may be provided for the outlet port, the valve opening to allow the air to escape when the pressure in the chamber exceeds a predetermined value. A non-return valve 36 may be provided for the inlet port. If the cushion is allowed to occupy the whole space between the surface and the bottom of the body of the vehicle, then sudden movements of the surface relative to the vehicle body will also cause sudden variations in the cushion pressure. When the cushion pressure is increased, some of the cushion air will escape through the fluid curtains, although some undesirable movement of the body will also probably occur. When the cushion pressure decreases, such as when the duct deflects downwards, a large quantity of air may be required to bring the pressure back to normal. This is not readily available and a corresponding undesirable movement of the vehicle body downwards will occur.

Figure 15:
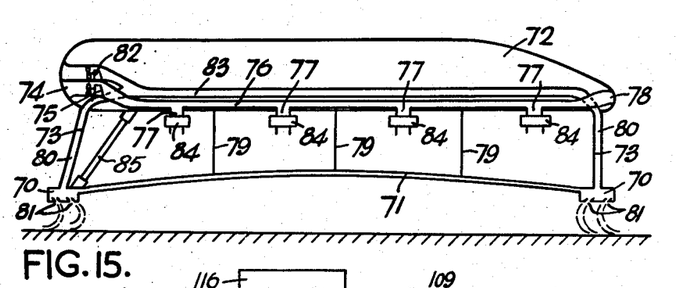
FIGURE 15 is a diagrammatic side elevation of a vehicle comprising a further embodiment of the invention.

One method of overcoming the difficulties just described is to provide a membrane at the level of the duct which may be supported in the manner shown in FIGURE 15 of the accompanying drawings. An annular duct 70 is formed around the periphery of a flexible membrane 71, the membrane extending over the entire area enclosed by the duct, being substantially of the shape and area of the bottom of the body 72 of the vehicle. The space between the bottom of the body 72 and the upper surface of the membrane 71 is totally enclosed by a flexible member 73. Air enters through an inlet 74 in the front of the body 72 and passes to compressors 75. From the compressors the air passes to a pipe or pipes 76 which extend the whole length of the body. The air in the pipe or pipes 76 serves two purposes. Openings 77 are provided in the pipes which communicate with the space enclosed by the flexible member 73, the membrane 71 and the bottom of the vehicle body. By this means the space is filled with air, maintained at a predetermined pressure, which is normally that of the cushion beneath the membrane 71. The air in the pipes 76 is finally expelled from the rear of the craft from nozzles 78 to propel or assist in propelling the vehicle. In normal operation, once the air in the aforesaid space has reached its correct pressure, all the air from the compressors 75 will be expelled from the nozzles 78. When the vehicle meets an obstruction the duct 70 and membrane 71 will deflect upwards at the front, causing a decrease in the volume of the enclosed space. This will cause air to be displaced from the space into the pipes 76 and thus out of nozzles 78. Similarly when any part of the duct and membrane deflects downward, which may be due to a hollow or to the restoring movement when the vehicle has passed over an obstacle, the volume of the enclosed space increases, air entering from the pipes 76. Whilst this adding and subtraction of air from the propulsion system will produce variations in thrust it will be seen that these variations are in phase with requirements. Thus, when meeting an obstacle, the front of the duct and membrane tilts up and there will be a slight rearward component on the inclined face. The extra propulsive effort provided by the air displaced from the enclosed space will tend to offset this. For stability, as previously stated, it is preferable that the enclosed space should be divided into separate compartments, for example by flexible diaphragms 79. In this case, of course, the openings 77 in the pipes 76 are arranged so that each compartment is in communication with the pipes. Air is also supplied to the duct 70 by a flexible tube 80, formed as part of the flexible member 73, the air being expelled from ports 81 to form the curtain system. This air for the curtain system is of a higher pressure than that required for filling the aforesaid enclosed space, and may be provided by separate compressors 82 and ducting 83. Alternatively, one system of compressors could provide all the air, the air for the filling of the enclosed space and for propulsion passing through a suitable pressure reducing device. Shut-off valves 84 are provided to retain air within the enclosed space when it is desired to shut off the compressors. At least one strut 85, or similar rigid locating member, is fitted, for maintaining the body of the vehicle and the flexibly supported duct and membrane in the correct positional relationship as relative vertical movement takes place. The strut 85, in the example shown, is pivotally connected at its ends to the body and the duct.

The actuation of theoretical movement of the duct as it passes over obstacles can be obtained in several ways. The simplest way is to arrange for the duct to move up and down in response to local pressure changes under it. For this to be obtained efficiently the fluid curtain system should be composed of at least two curtains one inboard of the other with, preferably, transverse fluid curtains which act to divide the curtain system into separate "cells" as previously described with reference to FIGURES 5 and 6. This form of curtain configuration ensures that a pressure increase or decrease will occur in any "cell" where the surface over which it is operating rises or falls. The increase in pressure obtaining when there is a relative rise of the surface acts on the duct and will cause the duct to deflect upwards until a new equilibrium position has been reached. A similar reverse effect takes place when the surface falls. The operation of a vehicle over, for example a wave moving in a direction parallel to the longitudinal axis of the vehicle is thus as follows. The front of the duct encounters the forward slope of the wave, the surface of the water rising relative to the duct. A local pressure rise occurs under the front of the duct which rises also. As the vehicle progresses over the wave, succeeding portions of the duct are raised in a similar manner, the front portion of the duct continuing to rise under the action of succeeding portions of the wave, until the crest is reached. As the front of the duct passes over the crest, the surface of the water falls away from the duct and a local pressure drop occurs under the front of the duct. The front portion of the duct thus falls, this action continuing for the length of the vehicle as the wave crest proceeds.

If a vehicle is travelling or hovering over waves which are travelling in any other direction, then a similar action as above takes place except that the action is along an axis at some angle to the longitudinal axis of the vehicle. It will thus be seen that, assuming the duct and supporting members are lightly constructed and easily deflected, the duct can be operated with very small clearance from the surface, while the body of the vehicle is at a hoverheight at which it will not be hit by the obstacles. As the power requirements for the air supply for forming the curtains is a function of the vertical height of the curtains there will be considerable saving in power where the curtain is formed below a flexible duct as herein described, compared with the case when the curtain is formed from ports in the bottom of the vehicle body which requires to be maintained at a hoverheight sufficient to avoid being struck by the obstacles.

In the examples so far described it will be seen that the flexibly attached or supported part or member forms a system which can be described as a "single stage" suspension system, in that the entire system is deflected by any irregularities in the surface over which the vehicle is operating. It is possible to make the supporting system a "two stage" system by replacing the duct 60, in the constructions illustrated in FIGURES 12 and 13 of the accompanying drawings, by an annular member of flexible material such as the construction shown in FIGURE 7 of the accompanying drawings. This arrangement would operate as follows. When passing over small obstacles, only the flexible tube 43 would deflect, the main support system comprising members 61 remaining substantially undeflected. For larger obstacles the flexible tube would first deflect, followed by the deflection of the main support system.

Whilst the deflection of the duct directly by the pressures acting beneath it may be satisfactory when the vehicle is hovering or travelling slowly, it is probable that, due to the inertia of the duct, when the vehicle is travelling fast the duct will not deflect quickly enough. It is possible to provide power operated means for deflecting the duct, the operating means being controlled by a local height sensitive device, which may be operated by the local variation in pressure under the duct.

Figure 16:
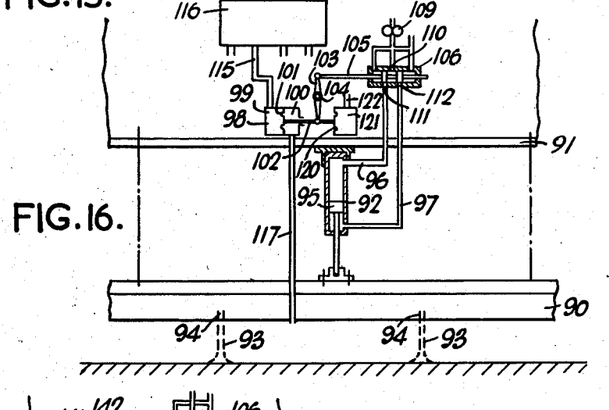
FIGURE 16 is a diagrammatic illustration of a control system for use with the invention.
Figures 17, 19:
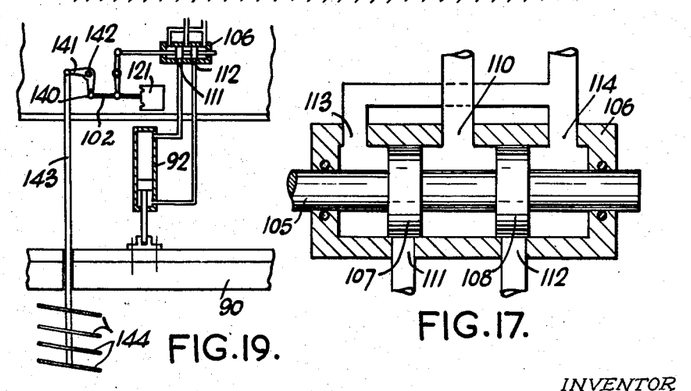
FIGURE 17 is an enlarged view of a valve forming part of FIGURE 16, FIGURES 18a and 18b are diagrammatic partial side elevations of a vehicle embodying the invention.
FIGURE 19 is a diagrammatic illustration of a further control system for use with the invention.

A suitable system for power operation of the duct is shown diagrammatically in FIGURE 16. A flexible duct 90 is supported from the bottom of the vehicle body 91 by hydraulic rams 92. A multi-curtain system is formed below the duct by a concentric series of ports, transverse curtains 93 being formed by transverse ports 94. The hydraulic rams are of the double acting type, fluid under pressure being supplied to one side or the other of the piston 95 by means of pipes 96 and 97. Mounted at some convenient position, preferably in the body of the vehicle, is a hollow member 98, divided into two compartments 99 and 100 by a gas tight diaphragm 101. Fastened to the diaphragm and passing through one wall of the hollow member is a rod 102. The end of rod 102 remote from the diaphragm is pivotally connected to one end of a lever 103 which is approximately at right angles to the rod 102. Lever 103 rotates about a fixed pivot 104, its other end being pivotally connected to the valve member 105 of a control valve 106, shown on an enlarged scale in FIGURE 17. The valve 106 is of a spool type having two cylindrical control lands 107 and 108 spaced axially apart and slidably mounted in a valve body. Fluid under pressure is supplied from a pump 109 to an inlet port 110 in the valve body. Two pressure supply or return ports 111 and 112 are also provided in the valve body. The positioning of the ports 110, 111 and 112 is such that when the valve member is in its mid position, the inlet port 110 is between the two control lands 107 and 108 of the valve spool, while the ports 111 and 112 are covered by the lands 107 and 108 respectively. Ports 111 and 112 communicate with pipes 96 and 97 respectively. Two further ports 113 and 114 are provided in the valve body, one at each end, and are at all times open.

The control valve operates as follows. The hollow member 98 is fed with two pressures, one being a datum pressure fed to chamber 99 by pipe 115 from a pressure supply 116. The other pressure is that under the relevant section of duct 90, the pressure being fed to chamber 100 by pipe 117. When the duct section is in its normal position the pressures in the two chambers 99 and 100 maintain the diaphragm 101 in its mid position, the rod 102 and lever 103 holding the valve member 105 in its mid or off position. If there is a relative rise of the surface towards the duct section, the pressure beneath the duct will increase. The pressure increase is fed to the chamber 100 and the diaphragm 101 will be moved, to the left as shown in FIGURE 16. Movement of the diaphragm will also move the rod 102, which in turn will cause the lever 103 to rotate about the pivot 104. Such movement of lever 103 will move the valve member 105 to the right, allowing fluid under pressure to flow from port 110 through port 112 and pipe 97 to the bottom of the hydraulic ram. This will cause the piston to rise, lifting the duct section to which it is connected. As the duct section rises, the pressure beneath it will normally fall, with the consequent resetting of the diaphragm 101 and the valve member 105 until equilibrium is once more achieved. If, however, the raising of the surface is caused by a wave, the surface will keep on rising and will thus maintain the increased pressure under the duct section until the crest of the wave has passed. Similarly, a pressure drop under the duct section is fed to the chamber 100 and reverse operation of the valve occurs. A control valve comprising member 98, valve 106 and the associated parts, is provided for each of the duct sections, a series of such control valves being fed the datum pressure from a single supply 116.

Whilst the control system is shown mounted in the body of the vehicle, the pressure under the duct being fed to it by pipe 117, it may be advisable to mount at least the member 98 on the duct 90. This may be desirable to prevent unsatisfactory operation due to pressure waves forming, and oscillating, in the pipe 117.

Under certain conditions of operation such as are likely to occur with high speeds, it is probable that in order to maintain the duct out of contact with waves, etc., some anticipatory sensing device will be required. The control valve as shown in FIGURE 16 is readily adapted to provide such a device, in that all that is required is to connect the pressure tapping of one duct section, i.e. pipe 117, to the relevant chamber 100 of the control valve for a duct section placed further back in the vehicle. The degree of anticipation can be altered depending upon the relative positions of the duct sections. The pressure beneath one duct section can be used to control the raising and lowering of a section immediately to the rear or separated by one or more sections. In order to provide control for the front section it will be necessary to provide a sensing element such as a float, placed ahead of the vehicle.

The control valve as described above also provides a convenient method for controlling the trim of the vehicle, as follows. The rod 102 is extended beyond its connection with lever 103 and is fastened at its end to a further diaphragm 120 which forms one of the walls of an air tight chamber 121. To this chamber is fed a controlled pressure via pipe 122. Should a change in trim of the vehicle be sensed by a trim sensing device (not shown), or should it be desired to vary the trim of the vehicle, then the pressure fed to the chamber 121 of selected control valves is varied which will cause the valve 105 to operate and raise or lower the respective duct sections, thus lowering or raising the vehicle body at the required position.

Instead of using the pressure variations beneath the duct sections to cause, directly or indirectly, the deflection of the duct, it is possible to use other methods such as planing surfaces or hydrofoils when operating over water, or wheels or skids, etc., when operating over land or similar surfaces.

Figure 18A:
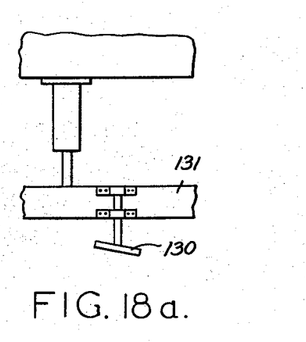
Figure 18B:
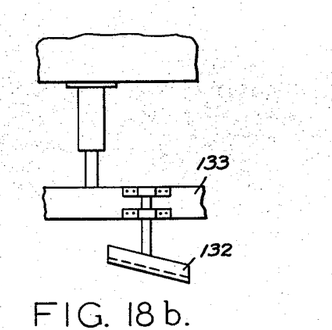

When using planing surfaces or hydrofoils, they may be connected directly to the duct sections. FIGURE 18a of the accompanying drawings shows a planing surface 130 fastened to a section of a duct 131. Similarly FIGURE 18b of the accompanying drawings shows a hydrofoil 132 fastened to a duct section 133. The planing surfaces and hydrofoils may be single as shown, or multiple ones may be used placed one above the other so that, as they become further immersed, a greater lifting force is provided. Alternatively the planing surfaces or hydrofoils may be connected to control valves which control, for example, hydraulic jacks. This method of control, which is similar to that shown in FIGURE 16 of the accompanying drawings, is shown diagrammatically in FIGURE 19 of the accompanying drawings. The control valve 106 and related elements are the same as in FIGURE 16 and similar reference numerals have been applied. Instead of a diaphragm moving rod 102, said rod is connected by a pivot 140 held in a slot in one end of a bell crank lever 141 rotating about a fixed pivot 142. The other end of the lever 141 is attached by means of rod 143 to planing surfaces 144 suspended beneath the duct 90. Whilst in this example the planing surfaces are shown controlling the duct section immediately adjacent to it, it will be appreciated that the planing surfaces can control a section further back, considered with relation to direction of movement, by, for example, connecting the ports 111 and 112 to the hydraulic jack of a more rearward duct section.

When a vehicle according to the invention is used over land or a similar surface, some other method of deflection, or causing deflection, of the duct may be used such as wheels, skids, caterpillar tracks, etc. This produces a very convenient form of vehicle since, although it is desirable to support a large proportion of the total vehicle weight by means of the cushion of fluid beneath the vehicle, it is desirable to have some form of physical contact with the ground to provide resistance to sideways movement of the vehicle due, for example, to a side wind. It is therefore arranged that the cushion supports say 90% of the total weight of the vehicle, the wheels or the like supporting the remaining 10%. The wheels are attached to a duct flexibly supported from the body of the vehicle, which makes it unnecessary for the vehicle to operate at a height which avoids obstacles and to thus require a large supply of power for providing the fluid flow for the formation of the curtains. It will be noted that with wheels attached to the duct flexibly supported below the body of the vehicle, the latter is analogous to the conventional forms of land transport in that the mobile or "unsprung" weight is reduced to a minimum.

Figure 20:
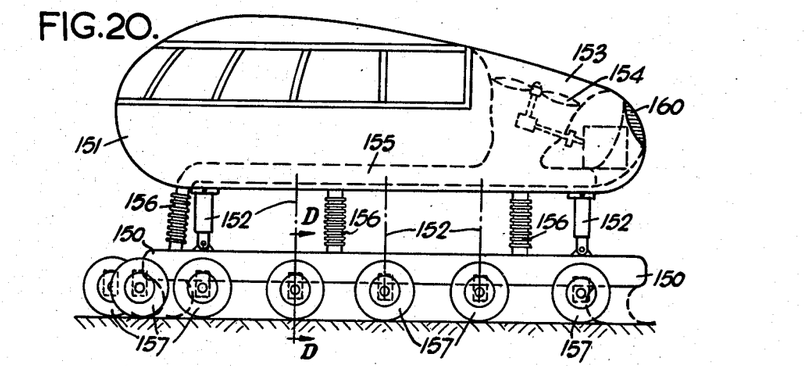
FIGURE 20 is a diagrammatic side elevation of yet another vehicle embodying the invention.
Figure 21:
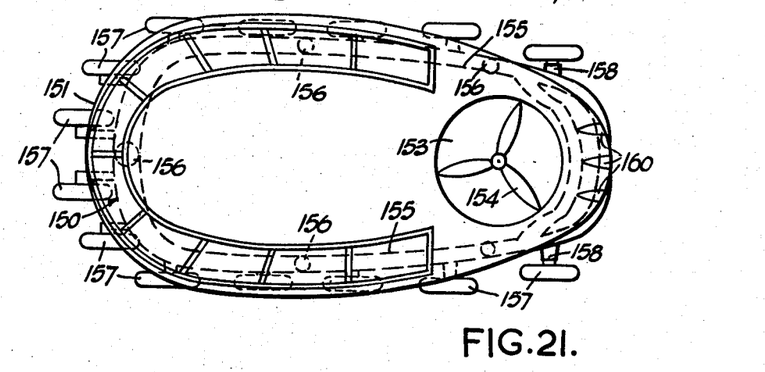
FIGURE 21 is a plan view of the vehicle illustrated in FIGURE 20.

FIGURES 20 and 21 of the accompanying drawings show as an example one form of wheeled vehicle according to the invention. A duct 150 is supported from the body 151 of the vehicle by suitable flexible supports as, for example, hydraulic rams 152. Air enters the body by means of an inlet 153 and is compressed by compressors 154. From the compressors the air is fed into a duct 155 running round the bottom of the body. Flexible pipes 156 connect the duct 155 in the body with the duct 150. Around at least part of the periphery of the duct 150 are mounted wheels 157, the wheels being mounted on brackets 158.

The duct 150 is preferably made of flexible material, the brackets for the wheels being fastened to rigid support members fastened to the bottoms of the hydraulic jacks 152. This form of construction allows the duct 150 to be deflected by the wheels when the latter pass over an irregularity of the surface. At the same time, should an obstacle, such as a small rock, occur between the paths taken by adjacent wheels, the duct will not be deflected, thus possibly hitting the obstacle. My making the duct of flexible material it will readily deform to pass over the obstacle with the minimum of damage. The wheels may be mounted directly on the brackets, as in FIGURE 21, or some form of sprung mounting may be provided as shown in FIGURE 22 of the accompanying drawings. The latter form of mounting is particularly suitable where it is intended to use the vertical displacement of the wheels to actuate a control system, similar to that described above for hydrofoils, etc., for power actuation of the supporting system. The spring 159 will allow the wheel to move freely, when encountering an obstacle, without being restricted in speed of movement due to the inertia of the duct. The vehicle shown in FIGURES 20 and 21 may be propelled in any convenient manner, for example, by fluid expelled out of ports 160, by a propeller or by power applied to at least some of the wheels.

In normal forms of construction, the wheels and their supporting means would be designed only to carry the aforesaid 10% of the total weight of the vehicle, plus some small additional safety margin. When the curtain system is shut off, such as when the vehicle is not operating, then some means of supporting the remaining 90% of the weight of the vehicle must be provided. This could be means such as extendable jacks brought into operation before shutting off the curtain, or alternatively, the flexibly supported part could be arranged to deflect upwards under the action of the additional weight until some other supporting means contacted the surface.

The form of land vehicle having the duct at a low level and provided with wheels lends itself very effectively to the use of a support system as shown in FIGURE 15.

Figure 23:
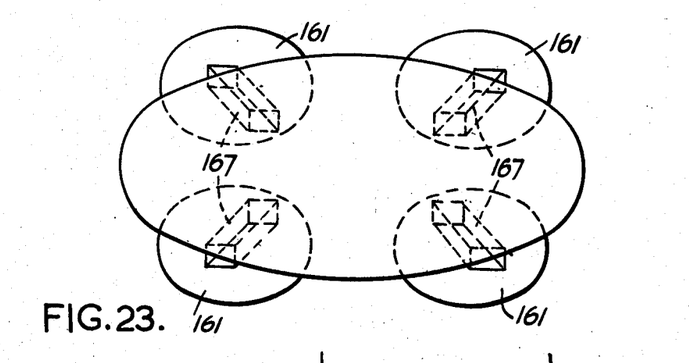
FIGURE 23 is a diagrammatic plan view of a still further embodiment of the invention.
Figure 24:
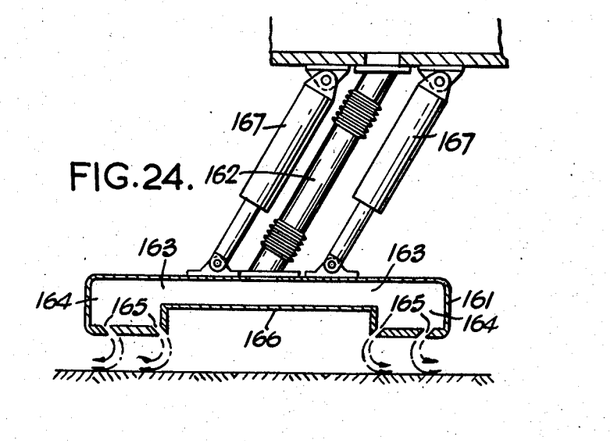
FIGURE 24 is a cross section on an enlarged scale of one of the flexibly supported members of the vehicle illustrated in FIGURE 23

In the forms of support systems so far described, the duct has been of approximately the same plane form as the body of the vehicle, although it will be appreciated that the plan forms of the body and the duct can differ. It may be more convenient to have the plan form of the vehicle body elongated for aerodynamic reasons, while the duct plan form may be circular, this providing the maximum cushion area for the minimum circumferential length of curtain. A still further example of a support system is one in which the flexibly supported duct, curtain system and cushion is split into several parts. FIGURE 23 of the accompanying drawings shows one particular form of such a support system in which there are four flexibly supported members 161. Each member has its own curtain system as can be seen in FIGURE 24 of the accompanying drawings which shows a cross section through one of the members 161. Fluid, generally air, is fed through flexible pipe 162 and pipes 163 to a duct 164 formed around the periphery of the member. The air is expelled from ports 165, formed in the bottom of the duct, to form the curtain system. The cushion of fluid supporting each member, and thus, in combination with the other members, the vehicle, is contained between the membrane 166 and the surface over which the vehicle is operating. The members 161 are flexibly supported from the body of the vehicle by supports 167, each member being in the form of a single section, or of a number of flexibly connected sections.

The invention is applicable to aircraft and similar vehicles as a landing aid, in use only during the landing and taking off of the vehicle. This would enable such vehicles to use landing grounds of a fairly rough nature, and of course to land and take off, at will, from either water or land surfaces without requiring the adaption of the landing gear.

In some forms of construction, the flexibly attached part has a duct portion, from which the fluid jets for the formation of the curtain system are expelled, of considerable width. This is especially the case where multiple curtain systems are provided. Due to the inclination of the surface of a wave, for example, or the inclination of the bottom surface of the duct when deflected, this width may result in one edge of a duct portion being very close to the surface while the opposite edge is so far away that the efficiency of the curtain is severely affected. This difficulty can be countered by suitably supporting the duct portion from the vehicle body by flexible means, such as the linkages of FIGURES 12 and 13 previously described, and by forming the duct in separate sections as in FIGURES 1–3. The duct sections will then follow quite closely the profile of the surface over which the vehicle is moving.

Figure 25:
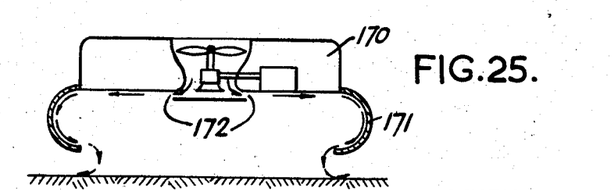
FIGURE 25 is a diagrammatic cross section of yet a further vehicle according to the invention.

FIGURE 25 of the accompanying drawings shows an extremely simple form of the vehicle in which the air for the formation of the curtain is expelled from a port in a horizontal direction. The body 170 has supported below it a flexible member 171, curved in section as shown, the air from an annular port 172 passing across under the bottom of the body of the vehicle and then being deflected down by the curved member 171, until it reaches the bottom edge where it issues to form a curtain. The curved cross section of the flexible member is maintained by the cushion pressure. Upward deflection of the flexible member compresses the cushion, which provides the necessary restoring force.

Whilst, in the examples so far described, the air for forming the curtain system has been supplied from a source originating in the body of the vehicle, provision may be made for mounting compressors or other sources of pressurized air on the flexibly supported member itself. When more than one member is provided, as in FIGURE 23, then pressurised air supply means may be mounted on each such member.

Finally, although the flexibly supported member or duct has been shown as extending in an annular form approximately the same in plan as the vehicle body, the member or duct may extend only along each side of the vehicle in which case the craft somewhat resembles a catamaran. The air curtain system at the front and rear of the vehicle is then formed by more powerful jets expelled from ports in the bottom of the vehicle body itself.

In operation it is intended that the flexibly supported member should deflect to the extent necessary to prevent the application of undesirable magnitudes of vertical acceleration to the body of the vehicle. Thus, when travelling over obstacles closely spaced relative to the length of the vehicle, as for example small waves, boulders and the like, then the flexibly supported member will deflect. When travelling over, for example, long waves or sand dunes, then the vehicle as a whole will move up and down over them and the vertical acceleration will then normally be of a more acceptable magnitude.

However, it is possible that even on long waves or similar obstacles, the vertical acceleration will, at the crests and troughs particularly, be of an undesirable magnitude. This can be at least partly obviated by a control system acting to control the vertical deflection of the flexibly supported part or member which is of a form similar to that illustrated in FIGURE 16 of the accompanying drawings, but in which the pressure under a duct section, such as is fed through pipe 117, is fed to a rate-of-change control valve, which is arranged to be inoperative below a predetermined rate of pressure change but will cause the flexibly supported part or member to deflect when the rate of pressure change rises above the aforesaid predetermined level.

I claim:

1. A vehicle of the type adapted for travelling or hovering over surfaces of land or water comprising a main body, means for producing a pressurized cushion of gas beneath said body capable of at least partially supporting the vehicle above the surface over which it is travelling or hovering, said cushion producing means having a part which is flexibly attached to said body so as to be capable of vertical movement relative thereto in response to variations in the height of said body relative to said surface, means for causing at least one curtain of moving fluid to issue from said part and flow towards said surface and at least partially contain said pressurised cushion of gas, and means for exerting on said flexibly attached part a restoring force tending to prevent vertical movement of said part relative to said main body.

2. A vehicle as claimed in claim 1, wherein said flexibly attached part includes a plurality of locally movable portions, and wherein said force exerting means are operative locally on said locally movable portions.

3. A vehicle of the type adapted for travelling or hovering over surfaces of land or water comprising a main body, means for producing a pressurized cushion of gas beneath said body capable of at least partially supporting the vehicle above the surface over which it is travelling or hovering, said cushion producing means having a part which is flexibly attached to said body so as to be capable of vertical movement relative thereto in response to variations in the height of said body relative to said surface, means for causing at least one curtain of moving fluid to issue from said part and flow towards said surface and to at least partially contain said pressurised cushion of gas, and means responsive to the variations in pressure beneath said flexibly attached part for controlling the vertical movement of said part relative to said main body.

4. A vehicle of the type adapted for travelling or hovering over surfaces of land or water comprising a main body, means for producing a pressurized cushion of gas beneath said body capable of at least partially supporting the vehicle above the surface over which it is travelling or hovering, said cushion producing means having a part which is flexibly attached to said body so as to be capable of vertical movement relative thereto in response to variations in the height of said body relative to said surface, means for causing at least one curtain of moving fluid to issue from said part and flow towards said surface and at least partially contain said pressurised cushion of gas, and means responsive to variations in the height of said flexibly attached part relative to said surface for moving said part in a vertical direction relative to said main body.

5. A vehicle as claimed in claim 4, including means for exerting on said flexibly attached part a force yieldably resisting vertical movement of said part relative to said main body.

6. A vehicle of the type adapted for travelling or hovering over the surface of land or water comprising a structure including a main body having an intake for fluid and a part positioned below said main body having a fluid ejecting port formed therein, means for drawing fluid through said intake and causing said fluid to issue from said port in the form of a curtain of moving fluid travelling across the gap existing between the vehicle structure and the surface over which the vehicle is travelling or hovering, said curtain in combination with said vehicle structure and said surface enclosing a pressurised cushion of gas having a pressure sufficient to at least partially support said vehicle above said surface, means for flexibly attaching to said main body at least a portion of said part from which the curtain-forming fluid issues, said flexible attaching means being so constructed and arranged that a restoring force is exerted on said portion tending to prevent vertical movement thereof relative to said main body, and means responsive to local variations in the height of said main body relative to said surface for deflecting said portion in a vertical direction against said restoring force.

7. A vehicle of the type adapted for travelling or hovering over the surface of land or water comprising a structure including a main body, means carried by said main body for forming and maintaining a pressurised cushion of gas between the structure of the vehicle and the surface over which the vehicle is travelling or hovering capable of at least partially supporting the vehicle above said surface, said means including means positioned below and connected to said main body for forming at least one curtain of moving fluid peripherally enclosing said pressurised cushion, means for flexibly attaching at least a portion of said curtain-forming means to said main body so that said portion may move vertically relative to said body, means for exerting on said flexibly attached portion a restoring force tending to prevent vertical movement thereof relative to said body, and means responsive to local variations in the elevation of said surface for deflecting said portion in a vertical direction against said restoring force.

8. A vehicle as claimed in claim 7, wherein said force exerting means comprises resilient expansible and contractible means interposed between said flexibly attached portion and said main body.

9. A vehicle as claimed in claim 7, wherein said force exerting means comprises a plurality of fluid pressure actuated rams interposed between said flexibly attached portion and said main body.

10. A vehicle as claimed in claim 7, wherein said flexibly attached portion includes means for forming at least two substantially parallel fluid curtains enclosing said pressurised cushion.

11. A vehicle as claimed in claim 10, wherein said flexibly attached portion also includes means for forming transversely extending fluid curtains dividing into compartments the space between said substantially parallel fluid curtains.

12. A vehicle as claimed in claim 7, including a servo mechanism responsive to the variations in pressure beneath said flexibly attached portion for controlling the deflection of said flexibly attached portion.

13. A vehicle as claimed in claim 7, including a servo mechanism for controlling said deflecting means in response to variations in the height of said flexibly attached portion relative to said surface.

14. A vehicle as claimed in claim 7, including a flexible member depending from said main body and forming at least part of an enclosure of a space beneath said main body containing a fluid under pressure, and wherein said flexibly attached portion forms part of said flexible member.

15. A vehicle as claimed in claim 7, wherein said flexibly attached portion includes a gas tight flexible membrane forming the upper boundary of said pressurised cushion.

16. A vehicle as claimed in claim 15, including a second gas tight flexible membrane enclosing a space between said first named membrane and said main body.

17. A vehicle as claimed in claim 16, including means for permitting the flow of gas into and out of the space between said first named flexible membrane and said main body enclosed by said second membrane so as to maintain the pressure in said space substantially constant.

18. A vehicle as claimed in claim 16, including ports in said second flexible membrane at the front and the rear of the vehicle through which air from the atmosphere through which the vehicle is travelling may flow into and out of the space between said first named flexible membrane and said main body enclosed by said second membrane.

19. A vehicle of the type adapted for travelling or hovering over the surface of land or water comprising a structure including a main body, means carried by said main body for forming and maintaining a pressurised cushion of gas between the structure of the vehicle and the surface over which the vehicle is travelling or hovering capable of at least partially supporting the vehicle above said surface, said means including means positioned below and connected to said main body for forming at least one curtain of moving fluid peripherally enclosing said pressurised cushion, and means including a plurality of fluid actuated rams for flexibly attaching at least a portion of said curtain-forming means to said main body so that said portion may move vertically relative to said body, said rams also being operative to exert on said flexibly attached portion a restoring force tending to prevent vertical movement thereof relative to said body.

References Cited by the Examiner
UNITED STATES PATENTS

| | | | |
|---|---|---|---|
| 936,395 | 10/09 | Worthington. | |
| 1,698,482 | 1/29 | Nicin | 180—7 |
| 2,743,787 | 5/56 | Seck | 180—7 |
| 2,829,846 | 4/58 | Keiper. | |
| 2,918,183 | 12/59 | Petersen et al. | |

OTHER REFERENCES

David Taylor Model Basin Report No. 1374, Aero Report 947.

A. HARRY LEVY, *Primary Examiner.*

WILLIAM J. KANOF, PHILIP ARNOLD, *Examiners.*